US012690090B2

(12) United States Patent
Chandrashekar et al.

(10) Patent No.: US 12,690,090 B2
(45) Date of Patent: Jul. 21, 2026

(54) TERMINAL REDIRECTION

(71) Applicant: Nokia Technologies Oy, Espoo (FI)

(72) Inventors: Subramanya Chandrashekar, Bangalore (IN); Tero Henttonen, Espoo (FI); Jarkko Tuomo Koskela, Oulu (FI); Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 284 days.

(21) Appl. No.: 18/272,853

(22) PCT Filed: Jan. 3, 2022

(86) PCT No.: PCT/EP2022/050017
§ 371 (c)(1),
(2) Date: Jul. 18, 2023

(87) PCT Pub. No.: WO2022/152584
PCT Pub. Date: Jul. 21, 2022

(65) Prior Publication Data
US 2024/0090072 A1 Mar. 14, 2024

(30) Foreign Application Priority Data

Jan. 18, 2021 (IN) .............................. 202141002174

(51) Int. Cl.
*H04W 76/27* (2018.01)
*H04W 36/00* (2009.01)
*H04W 36/08* (2009.01)

(52) U.S. Cl.
CPC ....... *H04W 76/27* (2018.02); *H04W 36/0033* (2013.01); *H04W 36/00698* (2023.05); *H04W 36/08* (2013.01)

(58) Field of Classification Search
CPC ........... H04W 76/27; H04W 36/00698; H04W 36/0033; H04W 36/08
See application file for complete search history.

(56) References Cited

U.S. PATENT DOCUMENTS

2013/0183979 A1* 7/2013 Chen ................. H04W 36/0058
455/436
2019/0349833 A1* 11/2019 Peng .................... H04W 36/322
(Continued)

FOREIGN PATENT DOCUMENTS

WO WO 2020/084595 A1 4/2020

OTHER PUBLICATIONS

CATT, "Signalling enhancement for Inactive state," 3GPP TSG-RAN WG2 Meeting #107, R2-1908902, Prague, Czech Republic, Aug. 26-30, 2019.
(Continued)

*Primary Examiner* — Jay L Vogel
*Assistant Examiner* — Maryam Emadi
(74) *Attorney, Agent, or Firm* — Barta Jones, PLLC

(57) ABSTRACT

Apparatuses and methods in a communication system are disclosed. User equipment transmits a connection request to a radio access node, indicating to the radio access node that the apparatus supports resume or setup to a radio access node of a different system or different frequency range. The user equipment receives instructions to switch to a radio access node of a different system or a radio access node utilising a different frequency range and performs random access procedure followed by a radio resource control complete message transmission to the instructed radio access node.

7 Claims, 9 Drawing Sheets

(56)  References Cited

U.S. PATENT DOCUMENTS

2020/0229104 A1*  7/2020  MolavianJazi ....... H04W 52/54
2021/0345208 A1*  11/2021  Rugeland .......... H04W 36/0038
2022/0095227 A1*  3/2022  Tsai ........................ H04L 5/001

OTHER PUBLICATIONS

Latheef, F. A. et al., "On the UE Context Retrieval Enhancements for Improved Inter-RAT Mobility," 2020 IEEE 3rd 5G World Forum, Sep. 10, 2019, pp. 324-329.

* cited by examiner

TERMINAL REDIRECTION

CROSS REFERENCE TO RELATED APPLICATION

This patent application is a U.S. National Stage application of International Patent Application Number PCT/EP2022/050017 filed Jan. 3, 2022, which is hereby incorporated by reference in its entirety, and claims priority to IN 202141002174 filed Jan. 18, 2021.

FIELD

The exemplary and non-limiting embodiments of the invention relate generally to wireless communication systems. Embodiments of the invention relate especially to apparatuses and methods in wireless communication networks.

BACKGROUND

The use of wireless communication systems is constantly increasing in many application areas. Communication that was previously realised with wired connections is replaced by wireless connections as the wireless communication systems offer many advantages over wired systems.

In many wireless communication systems, the terminal devices maybe in connected mode and in idle or inactive mode. In connected mode there typically is ongoing call or data transfer. In the latter cases there is typically no active connection. When there is a need for a connection for an idle or inactive terminal device, a connection to a base station or node is established or re-established.

Especially in wireless systems, load of the nodes or base stations is an important factor. If a node receiving a request from a terminal device is already heavily loaded, the request may be rejected, or the terminal may receive poor service. Thus, handling these situations with minimum effects on the terminal device and the node is advantageous.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

One or more examples of implementations are set forth in more detail in the accompanying drawings and the description below. Other features will be apparent from the description and drawings, and from the claims. The embodiments and/or examples and features, if any, described in this specification that do not fall under the scope of the independent claims are to be interpreted as examples useful for understanding various embodiments of the invention.

LIST OF DRAWINGS

Embodiments of the present invention are described below, by way of example only, with reference to the accompanying drawings, in which FIG. 1 illustrates an example of simplified system architecture of a communication system;

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain features, structures, units, modules etc. that have not been specifically mentioned.

Some embodiments of the present invention are applicable to a user terminal, a communication device, a base station, eNodeB, gNodeB, a distributed realisation of a base station, a network element of a communication system, a corresponding component, and/or to any communication system or any combination of different communication systems that support required functionality.

The protocols used, the specifications of communication systems, servers and user equipment, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof. 3GPP (3rd Generation Partnership Project) is an organization that is co-ordinating the development of many wireless communication systems such as 5G or NR.

Figure 1:
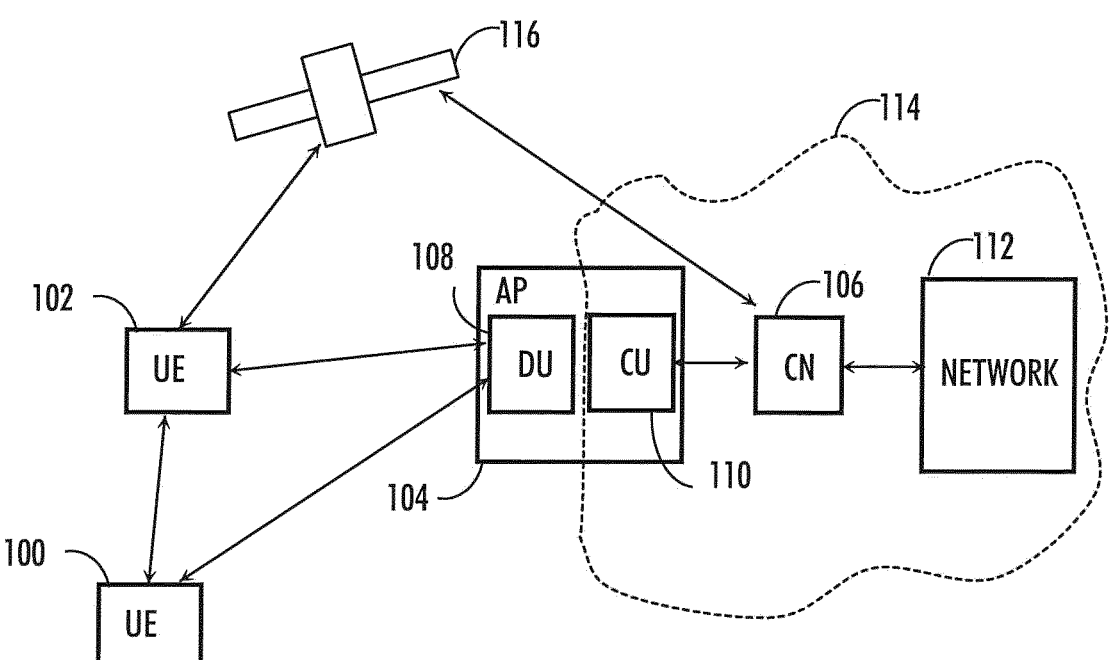

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows devices 100 and 102. The devices 100 and 102 are configured to be in a wireless connection on one or more communication channels with a node 104. The node 104 is further connected to a core network 106. In one example, the node 104 may be an access node such as (e/g)NodeB serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 106 (CN or next generation core NGC). Depending on the deployed technology, the (e/g)NodeB is connected to a serving and packet data network gateway (S-GW+P-GW) or user plane function (UPF), for routing and forwarding user data packets and for providing connectivity of devices to one ore more external packet data networks, and to a mobile management entity (MME) or access mobility management function (AMF), for controlling access and mobility of the devices.

Exemplary embodiments of a device are a subscriber unit, a user device, a user equipment (UE), a user terminal, a terminal device, a mobile station, a mobile device, etc The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, 6 or above 24 GHz—cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at or close to a remote antenna site (in a distributed unit, DU 108) and non-real time functions being carried out in a centralized manner (in a centralized unit, CU 110).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a (e/g)NodeB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2A:
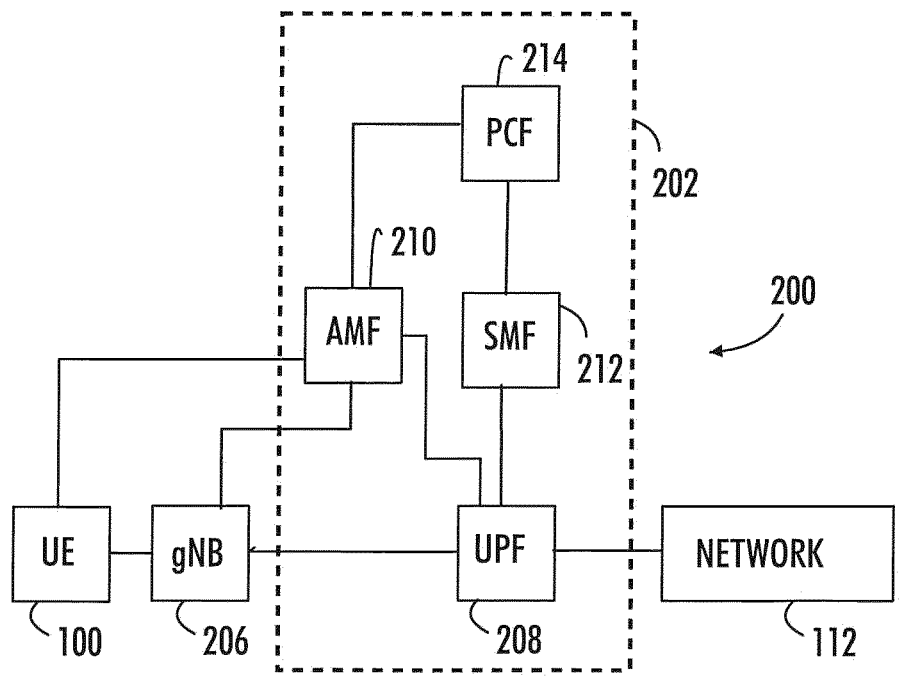
FIG. 2A illustrates an example of a communication system based on 5G network components.

FIG. 2A illustrates an example of a communication system 200 based on 5G network components. A user terminal or user equipment 100 communicating via a 5G network 200 with a data network 112. The user terminal 200 is connected to a Radio Access Network RAN node, such as gNodeB 206 which provides the user terminal with a connection to the network 112 via the Next Gen Core Network 202. The gNB 206 is connected to one or more User Plane Functions, UPF 208. The user terminal 200 is further connected to Core Access and Mobility Management Function, AMF 210, which is a control plane core connector for (radio) access network and can be seen from this perspective as the 5G version of Mobility Management Entity, MME, in LTE. The 5G network further comprises Session Management Function, SMF 212, which is responsible for subscriber sessions, such as session establishment, modify and release, and a Policy Control Function, PCF 214 which is configured to govern network behavior by providing policy rules to control plane functions. The network may naturally comprise other components, but they are not disclosed here for simplicity.

Figure 2B:
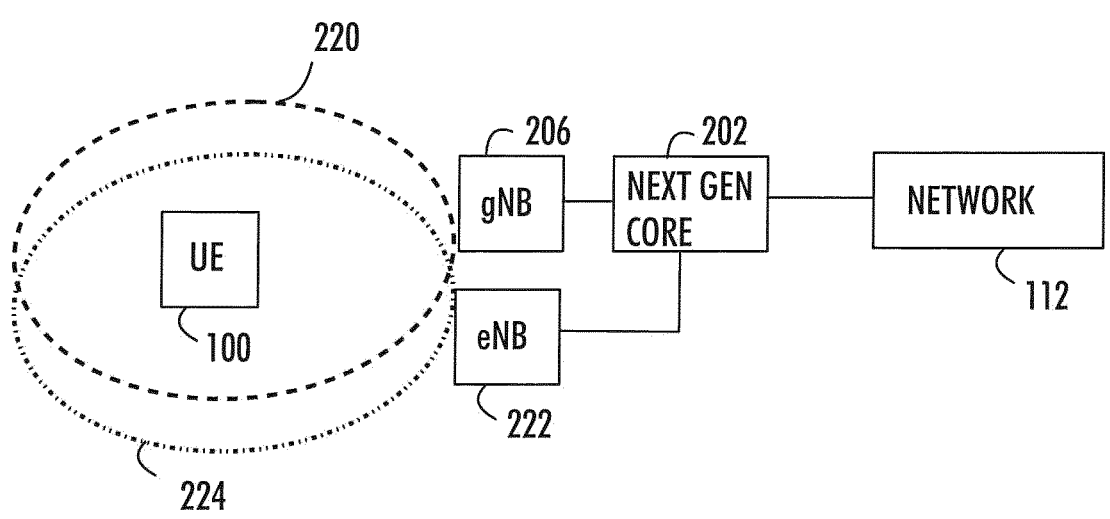
FIG. 2B illustrates an example of co-located radio access nodes.

FIG. 2B illustrates a simplified example of a situation where a RAN node, gNodeB, 206 based on 5G network components and a RAN node 222 based on LTE, eNodeB, are co-located. In an embodiment, both RAN nodes are connected to the Next Gen Core Network 202. The gNodeB serves a cell 220 and the eNodeB serves a cell 224. The term "eLTE" denotes one or more eNodeBs connected to the Next Gen Core Network 202, and an individual eNodeB may also denoted as "ng-eNB". The term "NG-RAN node" can denote either the gNodeB or eNodeB connected to the Next Gen Core Network 202

It may be further noted that for 5G or NR, there has currently been defined two separated frequency ranges for use. The first frequency range, denoted as Frequency Range 1 (FR1), comprises frequency bands below 6 GHz. The other frequency range, denoted as is Frequency Range 2 (FR2), comprises frequency bands from 24.25 GHz to 52.6 GHz.

Figure 3:
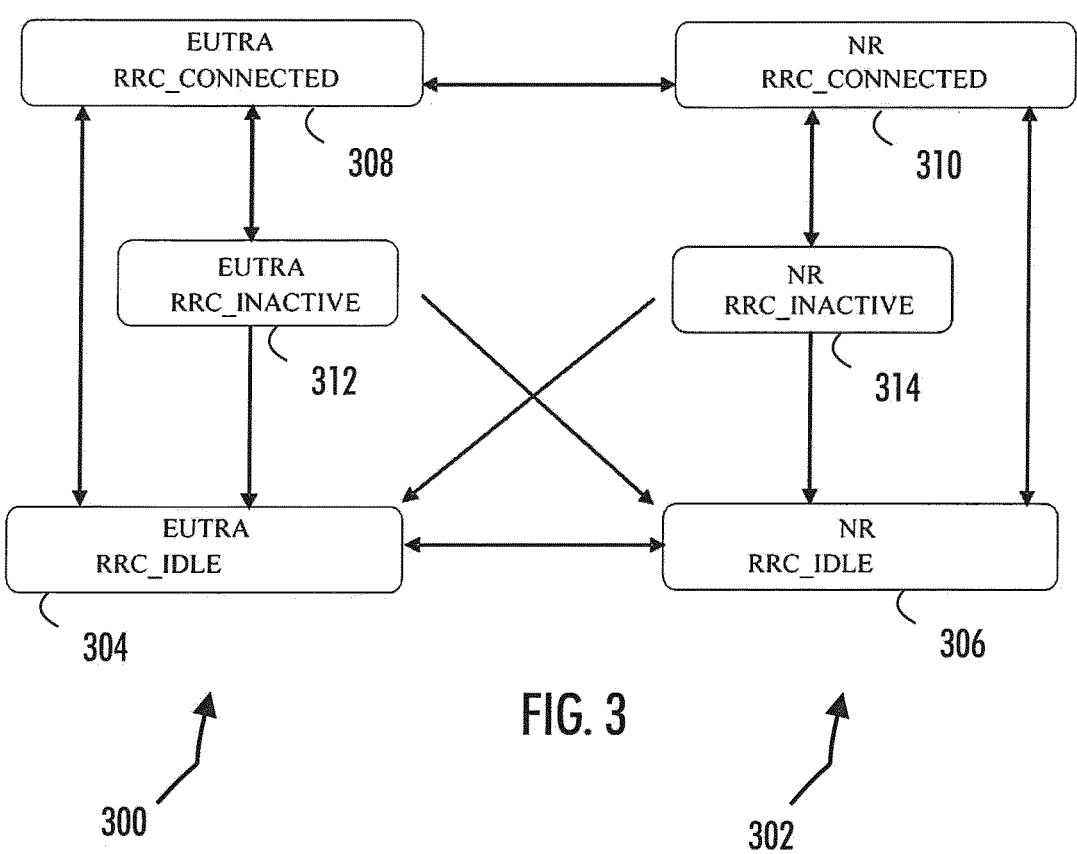
FIG. 3 illustrates an example of a radio resource control state transition diagram in 5G.

FIG. 3 illustrates an example of a radio resource control, RRC, state transition diagram in 5G. The diagram illustrates the states of an eLTE network (EUTRA) 300 and an 5G or NR network 302 and transitions between the states. The diagram assumes that user equipment is always either EUTRA or NR but never in both.

In 5G systems, where there is no RRC connection established for a terminal device or user equipment, UE, the UE is in RRC_IDLE state 304, 306. When an RRC connection has been established for a user equipment, the user equipment is either in RRC_CONNECTED state 308, 310 or in RRC_INACTIVE state 312, 314. When the established connection is not active, the UE is in RRC_INACTIVE state.

User equipment in RRC_IDLE may move into RRC_CONNECTED mode. User equipment in RRC_CONNECTED may move into RRC_IDLE or RRC_INACTIVE mode. UE in RRC_INACTIVE may move to RRC_CONNECTED. It may be noted that the UE must stay within the EUTRA or NR in these transitions. Further, UE in EUTRA RRC_INACTIVE may move to either EUTRA or NR RRC_IDLE. Likewise, UE in NR RRC_INACTIVE may move to either EUTRA or NR RRC_IDLE. UE can also perform a handover from €LTE to NR (or vice versa) in RRC_Connected or a reselection from (e)LTE to NR (or vice versa) in RRC_IDLE mode.

There may be situations where the RAN node to which UE wishes form a connection is unable to admit a UE in RRC_IDLE or RRC_INACTIVE state to move to RRC_CONNECTED state. This may happen for example of the current load of an NG RAN node is near overloading. However, the situation may be different in a co-located NR or eLTE node. This could happen, for example, when the eLTE node is loaded but the NR node is not (or vice versa), or when Dynamic Spectrum Sharing (DSS) operation within the same distributed unit uses uneven allocation wherein one of the RATs is prioritized for UEs supporting improved DSS efficiency operations and one RAT handles "legacy" UEs. Similarly, it may be desirable to have UEs connect to FR1 but always redirect some UEs to FR2 immediately upon connection resumption or connection establishment.

At present in an above kind of situation, there are some mechanisms for handling cross-RAT or cross-frequency operation with load balancing. Four different options are listed below.

An Intra-RAT redirection may be performed as an RRCRelease without storing UE context, indicating the frequency layer to where UE should move. This will cause the UE to initiate a second connection establishment attempt at the indicated frequency after obtaining synchronization.

An Intra-RAT handover may be performed after RRC connection establishment as part of RRCReconfiguration procedure. Prior to this, both RRC context and Access Stratum, AS, security need to be established. As part of the handover procedure, UE context can be moved between the source and target cells, but this takes some time and UE will have to obtain synchronization to the target cell during the handover process.

An Inter-RAT redirection will cause UE to release the currently stored UE context and start connection establishment attempt according to the other RAT mechanisms after obtaining synchronization.

An Inter-RAT handover is similar to redirection, but like with intra-RAT handover, the connection with the source RAT needs to be established first and security activated before sending the handover command. The UE will also release the already-established source RAT RRC context upon initiating the handover, with the remaining steps similar as with inter-RAT redirection.

In all of the above existing mechanisms, the UE context is established based on intra-RAT context information. These solutions are inefficient and require a lot of signalling.

Figure 4A:
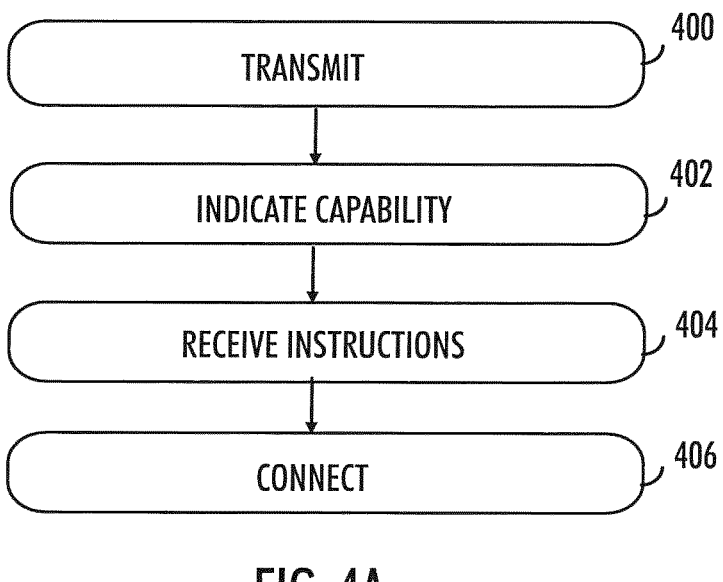
FIGS. 4A, 4B, 5 and 6 are flowcharts illustrating some embodiments.

The flowchart of FIG. 4A illustrates an embodiment. The flowchart illustrates an example of the operation of an apparatus. In an embodiment, the apparatus may be a terminal device, user equipment, or a part of a terminal device r user equipment for example.

In step 400, the apparatus is configured to transmit a connection request to a radio access node. If the apparatus is in RRC_INACTIVE state, it is configured to transmit an RRC connection resume request. If the apparatus is in RRC_IDLE state it is configured to transmit an RRC setup request.

In step 402, the apparatus is configured to indicate to the radio access node that the apparatus supports resume or setup to a radio access node of a different system or different frequency range. For example, if the apparatus is in RRC_INACTIVE or RRC_IDLE state in (e)LTE, it may inform the radio node that it supports NR or vice versa. Further, if the apparatus is in NR, it may inform that it supports resuming or moving from FR1 to FR2 or vice versa.

In an embodiment, the apparatus may indicate that it supports cross-RAT or different frequency range either implicitly (for example via message type) or explicitly (for example via a new field within the message or via some bits within existing fields that are reinterpreted).

In an embodiment, the apparatus performs RRC resume or setup in a cell that cannot accept the connection, for example due to being overloaded or about to get overloaded. However, the cell may have a co-sited inter-RAT or inter-frequency cell.

In step 404, the apparatus is configured to receive from the radio access node instructions to switch to another to a radio access node of a different system or a radio access node utilising a different frequency range.

In step 406, the apparatus is configured to perform random access procedure followed by a radio resource control complete message transmission to the instructed radio access node.

Figure 4B:
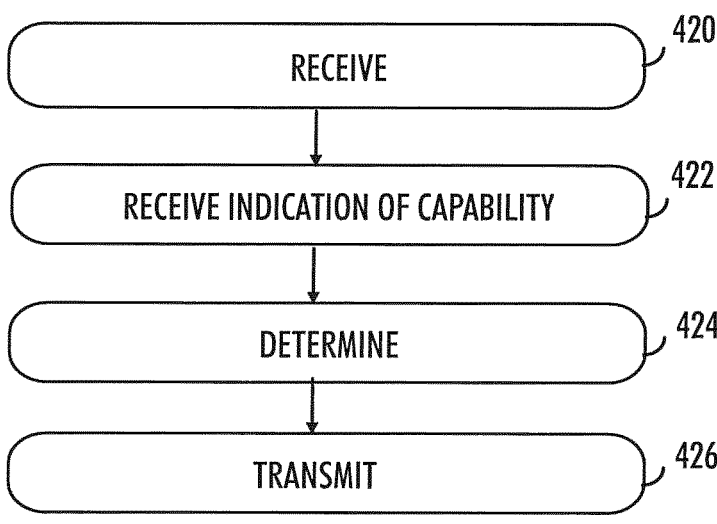

The flowchart of FIG. 4B illustrates an embodiment. The flowchart illustrates an example of the operation of an apparatus. In an embodiment, the apparatus may be a network element, a base station, (e/g)NodeB or a part of a such an apparatus.

In step 420, the apparatus is configured to receive a connection request from user equipment in inactive or idle mode.

In step 422, the apparatus is configured to receive from the user equipment an indication that the user equipment supports resume or setup to a radio access node of a different system or different frequency range.

In an embodiment, the user equipment may indicate that it supports cross-RAT or different frequency range either implicitly (for example via message type) or explicitly (for example via a new field within the message or via some bits within existing fields that are reinterpreted).

In step 424, the apparatus is configured to determine that the apparatus is unable to serve the user equipment. The apparatus may be overloaded or about to get overloaded, for example. However, the apparatus may have a co-sited inter-RAT or inter-frequency cell.

In step 426, the apparatus is configured to transmit, based on the determination, to the user equipment instructions to switch to another radio access node of a different radio access technology (RAT) or a radio access node utilising a different frequency range (in the same RAT).

Figures 5, 6:
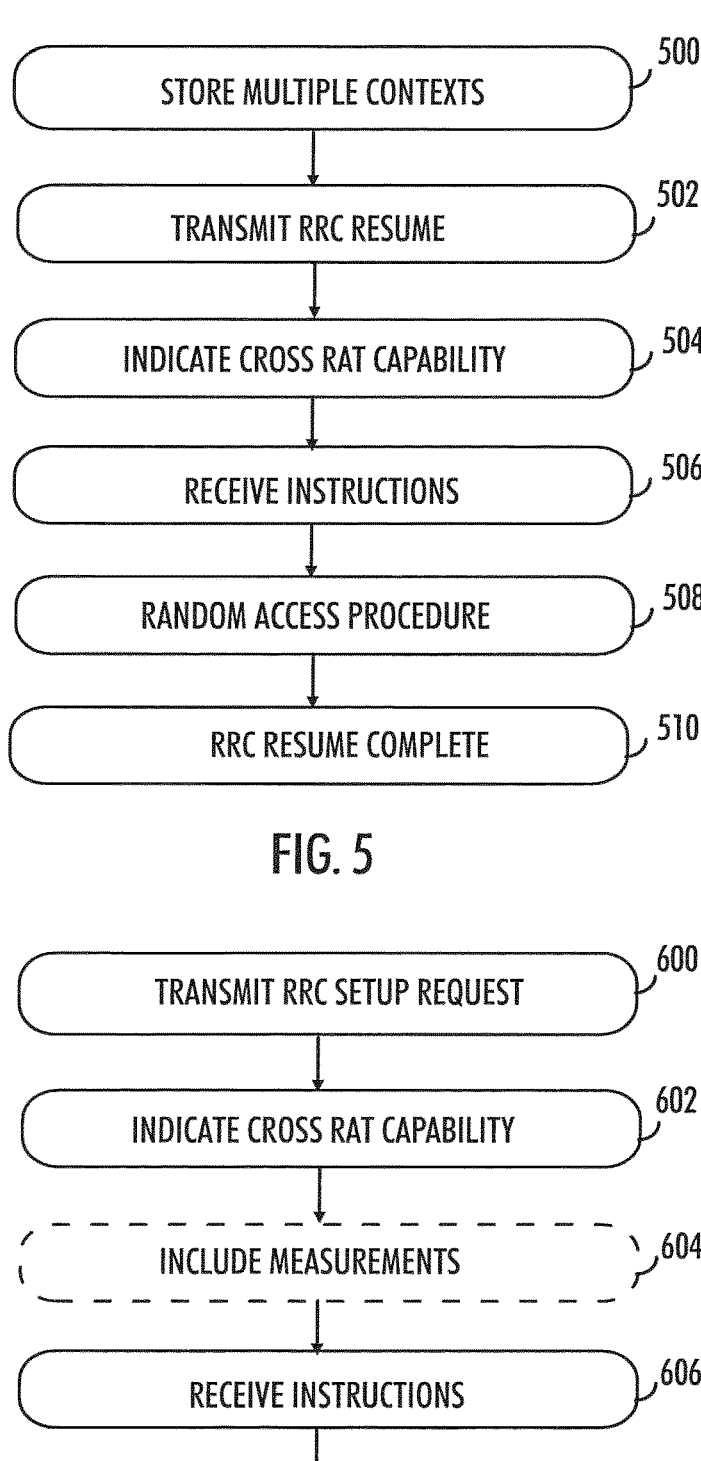

The flowchart of FIG. 5 illustrates an embodiment. The flowchart illustrates an example of the operation of an apparatus. In an embodiment, the apparatus may be a terminal device, user equipment, or a part of a terminal device or user equipment for example.

In this example, a user equipment is in RRC_INACTIVE state and needs to move to a connected state. However, the radio access node is unable to serve the user equipment.

In step 500, the apparatus is configured to store more than one RAT context for the same UE. For example, the apparatus may be configured to store UE contexts for both (e)LTE and NR systems. In an embodiment, the apparatus may store more than one context when assigned by the network. In an embodiment, the network may request this from the apparatus when the apparatus enters RRC_INACTIVE state for the first time.

In step 502, the apparatus is configured to transmit an RRC connection resume request to a radio access node.

In step 504, the apparatus is configured to indicate to the radio access node that the apparatus supports an RRC resume to a radio access node of a different system or different frequency range. The indication may be transmitted alongside the connection resumption either implicitly or explicitly.

In step 506, the apparatus is configured to receive from the radio access node an indication to use a stored context that is different from the one used for transmitting the RRC connection resume request. For example, apparatus may transmit the resume request to an eLTE radio access node, but the eLTE access node may instruct the apparatus to use an NR context instead in an NR cell, or vice versa.

The above may also apply for same RAT but inter-frequency carrier (for example between FR1 and FR2 of NR) either as part of the UE context or indicated separately.

In step 508, the apparatus is configured to perform random access procedure with the suggested radio access node. The procedure may comprise messages Msg1 and Msg2, for example.

In step 510, the apparatus is configured to transmit a radio resource control complete message (Msg5) to the instructed radio access node.

Thus, in an embodiment, after having been instructed to switch to the other RAT or frequency, the apparatus may complete access only performing partial initial access (such as random access and Msg5) on that carrier and not send the entire initial access. Thus, Msg3 and Msg4 may be skipped, thus saving some signalling, compared to the existing redirection procedures towards the other RAT or frequency.

The flowchart of FIG. 6 illustrates an embodiment. The flowchart illustrates an example of the operation of an apparatus. In an embodiment, the apparatus may be a terminal device, user equipment, or a part of a terminal device or user equipment for example.

In this example, a user equipment is in RRC_IDLE state and needs to move to a connected state. However, the radio access node is unable to serve the user equipment.

In step 600, the apparatus is configured to transmit an RRC setup request to a radio access node.

In step 602, the apparatus is configured to indicate to the radio access node that the apparatus supports RRC setup to a radio access node of a different system or different frequency range. The indication may be transmitted alongside the setup request either implicitly or explicitly.

In an optional step 604, the apparatus is configured to include measurements of at least one inter-frequency or inter-RAT cell, which is different from the cell with which it is performing initial access.

In step 606, the apparatus is configured to receive from the radio access node an indication of a target node where the apparatus shall be admitted.

In step 608, the apparatus is configured to perform random access procedure with the suggested radio access node and/or cell. The procedure may comprise messages Msg1 and Msg2, for example.

In step 610, the apparatus is configured to transmit a radio resource control complete message (Msg5) to the instructed radio access node.

Thus, as in the example of FIG. 5, after having been instructed to switch to the other RAT or frequency, the apparatus, in an embodiment, may complete access only performing partial initial access (such as random access and Msg5) on that carrier and not send the entire initial access. Thus, Msg3 and Msg4 may be skipped, thus saving some signalling, compared to the existing redirection procedures towards the other RAT or frequency.

The apparatus is configured to perform the random access procedure to the designated target cell, which allows it to acquire synchronization to the cell (as per existing initial access procedures), but can save some signalling that would otherwise be required for redirection. In a further embodiment, it may be possible to configure the UE to perform contention free random access procedure depending on the RAN node collocation or communication over the Xn interface.

Figure 7:
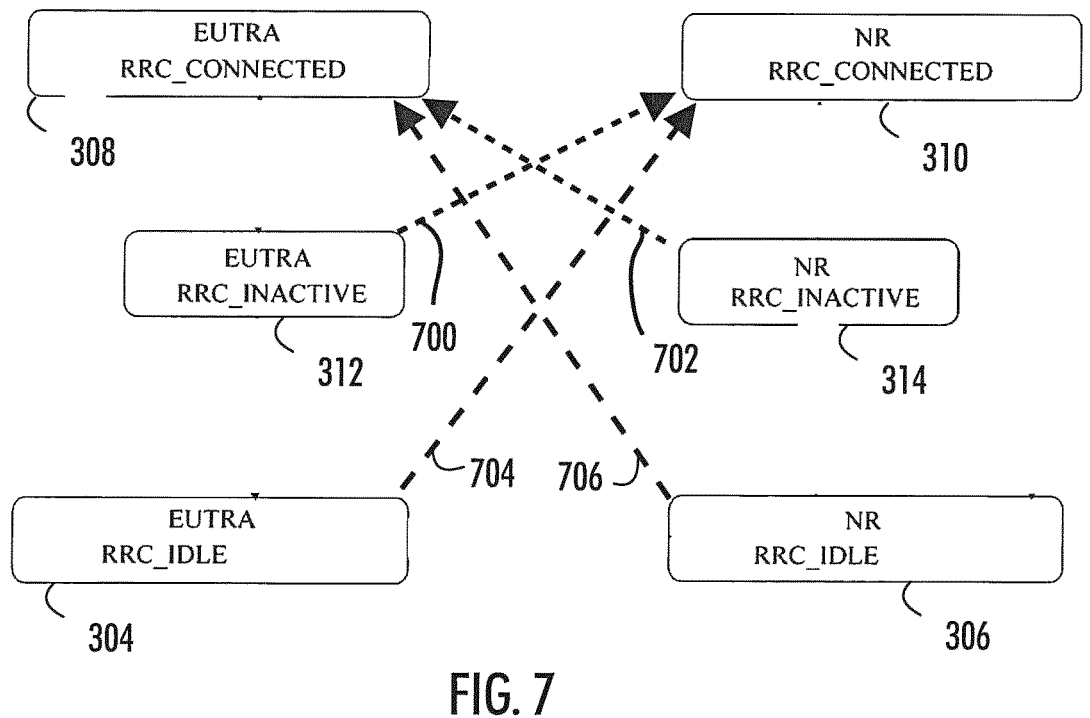
FIG. 7 illustrates an example of a radio resource control state transition diagram.

FIG. 7 illustrates an example of a radio resource control, RRC, state transition diagram in 5G. The figure illustrates new transitions enables by the above-described embodiments. A user equipment may move 700, 702, 704, 706 from an inactive 312, 314 or idle 304, 206 state to a connected state 308 310 of a radio access node of a different RAT.

Figure 8:
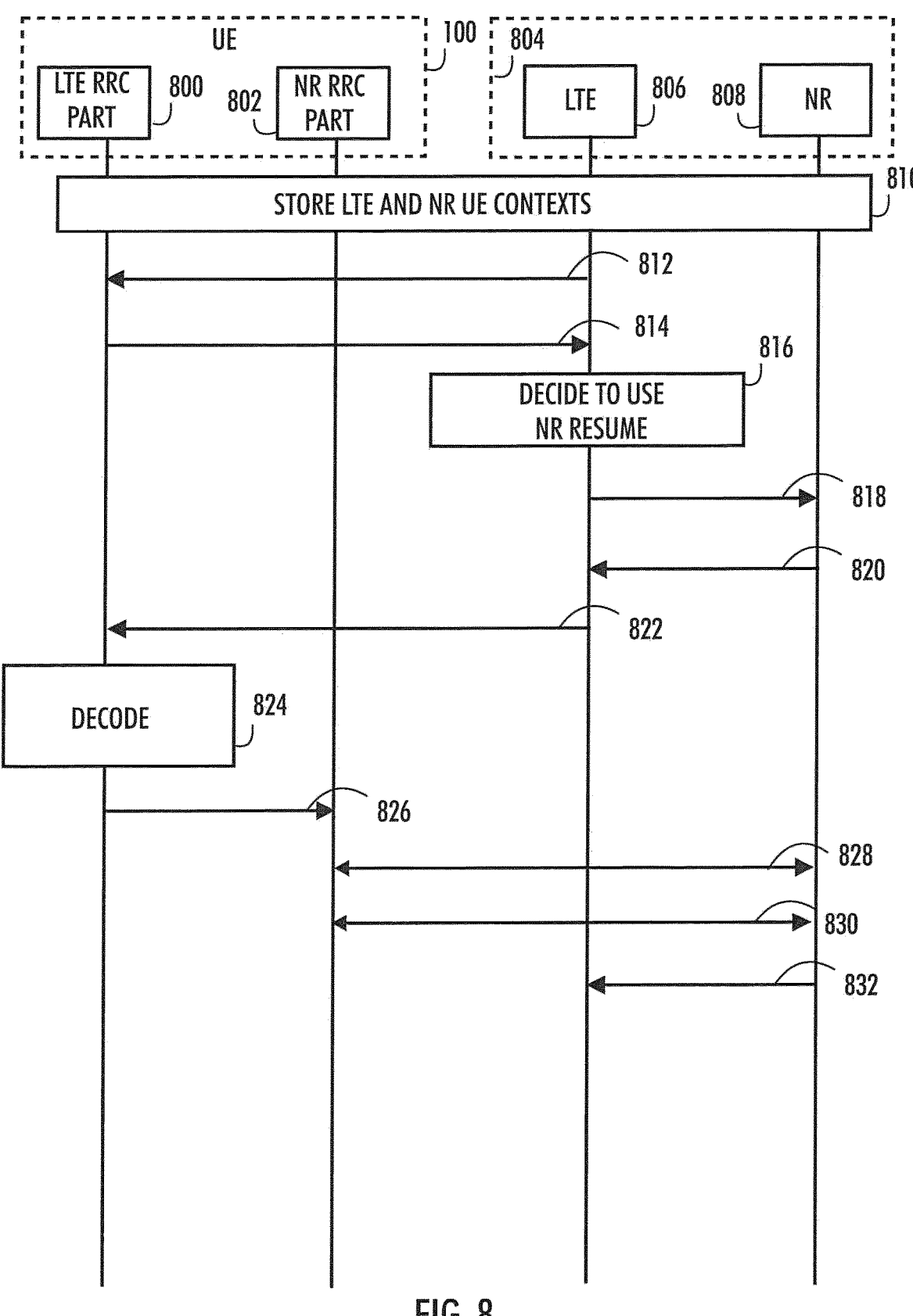
FIGS. 8, 9A and 9B are signalling charts illustrating some embodiments.

FIG. 8 is a signalling chart illustrating an embodiment. In this example, a user equipment is in RRC_INACTIVE state and needs to move to a connected state. However, the radio access node is unable to serve the user equipment. The UE 100 comprises an eLTE RRC part 800 and a NR RRC part 802. A network 804 comprises an eLTE radio access node 806 and an NR radio access node 808.

The UE 100 and network store 810 more than one RAT context for the same UE. For example, UE contexts for both eLTE and NR systems may be stored.

The UE 100 may receive the contexts from the network. In an embodiment, the UE may be provided an eLTE context as needed, for example, whenever a UE is moved to eLTE from NR due to RRC Resume in an overloaded NR cell for the first time. From thereon, the UE is configured to store both contexts. In an embodiment, the UE is provided NR and eLTE contexts when the UE is transitioned to RRC INACTIVE. For example, the RRC Release message can be used for this purpose.

The eLTE radio access node indicates 812 to the UE that cross-RAT resume is allowed. Thus, the UE gets knowledge that cross-RAT resume is allowed and can therefore utilize initial access messages that indicate the cross-RAT approach.

The UE transmits an RRC connection resume request 814 to the eLTE radio access node.

In an embodiment, the UE may indicate cross-RAT resume capability in connection with the request. UE may indicate that it supports cross-RAT resume either implicitly (for example via message type) or explicitly (for example via a new field within the message, via some bits within existing fields that are reinterpreted). In an embodiment, the UE may also include validity information about possible targets. the validity information may comprise measurement results, which may be actual Reference Signal Received Power, RSRP, values, truncated RSRP values such as RSRP values with limited value range, a single-bit indication that certain cell(s) meet pre-defined criteria or implicit indication that at least one measured cell meets predefined criteria.

The eLTE radio access node 806 receives the request and determines that it is unable to serve the user equipment and decides 816 to use NR resume for the UE.

The eLTE radio access node 806 transmits a message 820 to the NR radio access node 808 indicating that a cross-RAT resume for the UE 100 is needed.

The NR radio access node 808 decides to accept the UE and transmits a message 820 to the eLTE node indicating the required information needed for the resume based on UE context. In an embodiment, these messages 820, 822 may be transmitted over Xn interface between the nodes.

The eLTE radio access node 806 transmits to the UE eLTE RRC resume 822, indicating that NR RCC resume is to be performed. The message comprises required information on the target radio access node, such as frequency, temporary identifier, random access resources, for example.

The similar procedure may be applied to other direction, i.e from NR to eLTE.

In case of a user equipment having changed the NG RAN node in INACTIVE state, a user equipment cannot be moved to eLTE or another frequency of NR without UE context retrieval from old serving gNB (as old serving gNB and target gNB are different). To determine suitable target radio access node, UE measurements may be needed. When the UE inter-RAT/inter-frequency measurements are available, UE may be moved to the target RAT/different frequency. Below are discussed some examples of target cell determination.

The UE decodes 824 the message with the NR indication and activates 826 NR UE context with the received network information.

The UE performs random access procedure 828 (Msgs 1&2) with the NR node 808, and RRC resume complete 830. Messages Msg3 and Msg4 are not needed.

Finally, the NR node 808 indicates 832 to the eLTE node that connection establishment with the UE succeeded.

In an embodiment of a cross-RAT resume operation, a user equipment is in RRC INACTIVE with both NR and LTE contexts stored. The network, either NR or LTE, may indicate via system information which RAT (NR or LTE) the user equipment should use when requesting for resumed connection. The user equipment is configured to use the indicated RAT for resume procedure.

In an embodiment of a cross-RAT resume operation, a user equipment is in RRC INACTIVE with both NR and LTE contexts stored. The user equipment initiates Resume procedure by transmitting an RRC Resume Request. The network sends an RRC Release indicating that the Resume shall be started in other RAT (LTE or NR). The user equipment is configured to start Resume procedure on the indicated RAT.

In an embodiment of a cross-RAT resume operation, a user equipment is in RRC INACTIVE with both NR and LTE contexts stored. The user equipment initiates Resume procedure by transmitting an RRC Resume Request. The network sends an RRC Release configuring other RAT. The user equipment is configured to start Resume procedure using the configuration on other RAT.

In an embodiment of a cross-RAT resume operation, a user equipment is in RRC INACTIVE with both NR and LTE contexts stored. The user equipment initiates Resume procedure by transmitting an RRC Resume Request. The network sends an RRC Release configuring other RAT access procedure. The user equipment is configured to start other RAT access procedure using the configuration on other RAT.

Regarding determining the target cell user equipment performing RRC Resume outside RAN notification Area, RNA, following may be considered.

Inactive-Radio Network Temporary Identifier, I-RNTI, has 40 bits and the number of bits available to represent user equipment identification, UE ID, is quite flexible. Assuming for example that 24 bits is used for UE ID representation, the radio access technologies and frequencies supported by the UE RAT and Frequencies could be determined based on the allocated I-RNTI. In an embodiment, a few bits of the I-RNTI may be used for this purpose. Thus, network may determine the frequencies supported by user equipment based on allocated I-RNTI. Then, the user equipment may be configured to perform measurements on frequencies where there is available capacity.

In an embodiment, the configuration of the measurements could be performed either when the user equipment is sent to RRC INACTIVE state or by indicating in the System Information Block, SIB, of an overloaded cell, to all RRC INACTIVE user equipment, to perform measurements on suggested frequencies. The user equipment which are capable of supporting the indicated frequencies could already perform measurements and indicate along with the RRC Resume message.

In an embodiment, user equipment in RRC INACTIVE could be configured to perform measurements after context relocation from the anchor node, which enables the target radio access node to determine the load of the user equipment, i.e actual number of bearers and/or Protocol Data Unit, PDU, sessions of the user equipment. This also enables the network to identify the right target.

In an embodiment, for user equipment not at cell edge, the user equipment could be temporarily (performing context fetch in parallel) moved to CONNECTED state at the target radio access node with no Dedicated Radio Bearers) and requested for inter-RAT and/or inter-frequency measurements. A specific 64-bit message (msg3) on Common Control Channel, CCCH, may be used for the temporal transfer to CONNECTED state and a Msg4 may be used for the measurement request.

It may be noted that in the above examples, the user equipment is configured to store the INACTIVE context and not flush it.

Figure 9A:
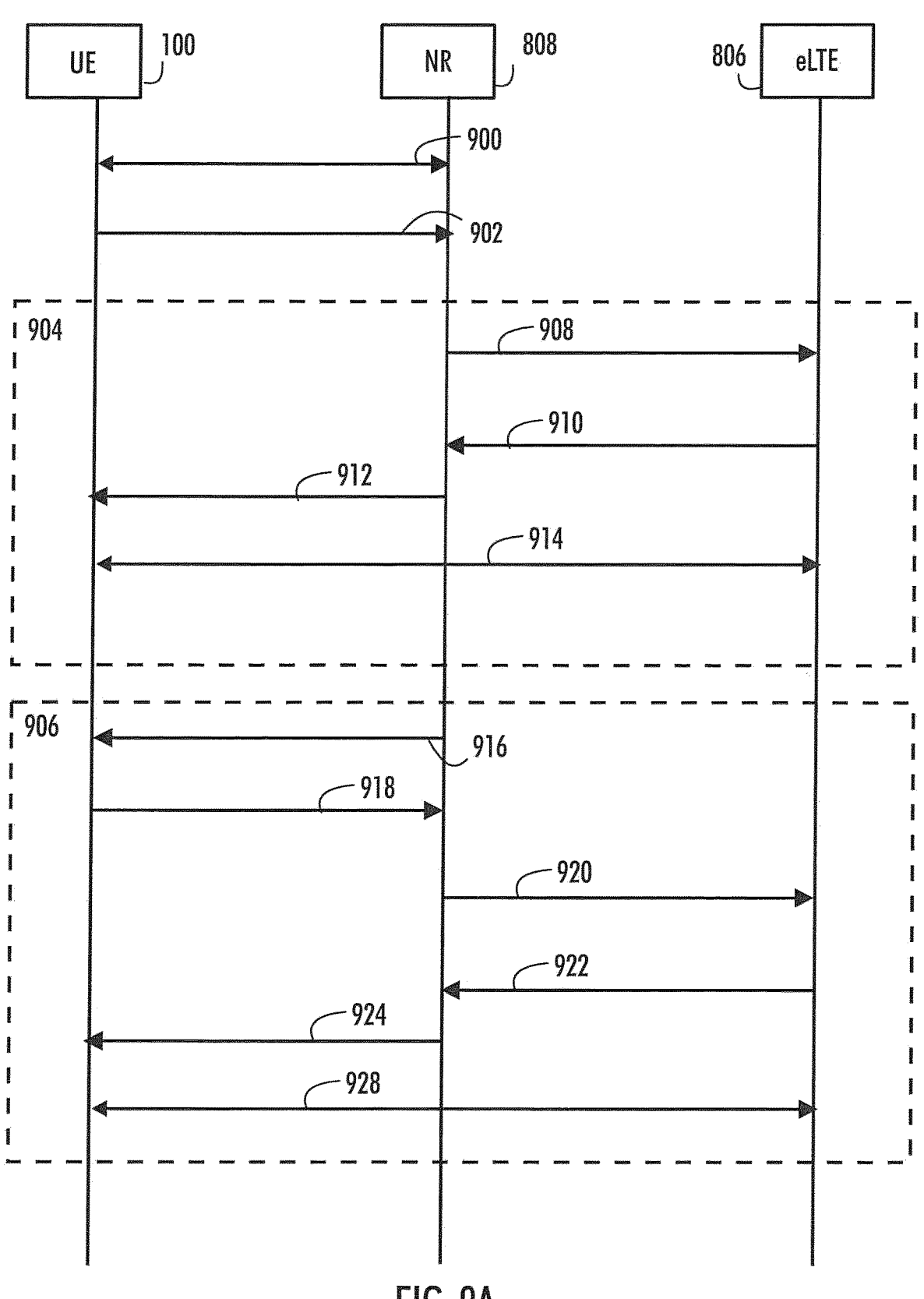

FIG. 9A is a signalling chart illustrating an embodiment. In this example, a user equipment is in RRC_IDLE state and needs to move to a connected state. However, the radio access node is unable to serve the user equipment because of being overloaded or almost coming to an overload state, for example. In such situation, it is preferable to offload the user equipment if possible, depending the capacity available in other nodes of a different RAT or a different frequency that may have overlapping coverage.

The signalling chart discloses two alternative embodiments, 904 and 906.

First the user equipment 100 performs random access procedure 900 with NR radio access node 808. Then it transmits an RRC Setup Request 900 to NR radio access node 808. The request may comprise information that the user equipment supports RRC setup to a radio access node of a different system. The indication may be realised implicitly (for example. via message type or other field presence) or explicitly (for example via explicit signalling bit, possibly via reinterpreting existing bits), thus allowing the node to determine if a cross RAT redirection can be performed.

In an embodiment, the indication may also imply which cell(s) are considered measurable according to network-given criteria (such as RSRP, Q threshold, synchronization acquired, Channel-state information, for example).

In first alternative 904, the node 808 transmits an Inter-RAT redirection request 908 to another radio access node 806, for example to an eLTE node. The eLTE node 806 responds with an Inter-RAT redirection response 910 including the configuration information for the UE, informing that it allows the user equipment to access the eLTE node.

The node 808 transmits an RRC setup (RRC redirection without reject) message 912 to the user equipment which then performs random access procedure 914 with the eLTE node 806.

In second alternative 904, the node 808 transmits an RRC setup (RRC redirection without reject) message 916 to the user equipment. The node 808 indicates to the user equipment to confirm if the inter-RAT cell measurement is good enough.

The user equipment transmits an RRC setup complete message 918 to the node 808, the message comprising the required measurement.

The node 808 transmits an Inter-RAT redirection request 920 to another radio access node 806, for example to an eLTE node. The eLTE node 806 responds with an Inter-RAT redirection response 922, informing that it allows the user equipment to access the eLTE node.

The node 808 uses an RRC Reconfiguration procedure 924 to redirect the user equipment to the target frequency cell by facilitating a redirection with only random access (using Contention-Based Random Access CFRA or Contention-Free Random Access CBRA).

The user equipment performs random access procedure and RRC reconfiguration complete 926 with the eLTE node 806.

Figure 9B:
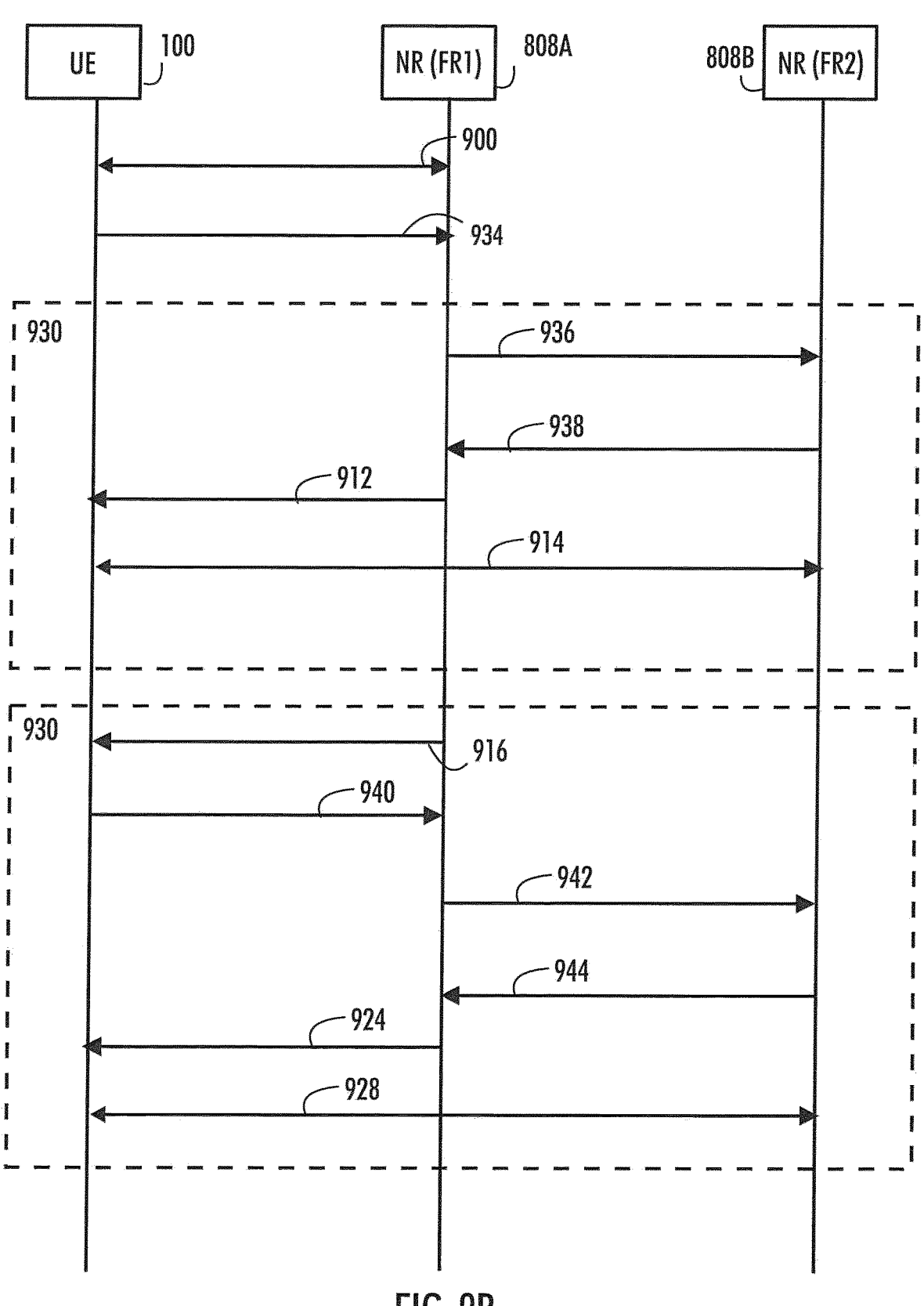

FIG. 9B is a signalling chart illustrating an embodiment. In this example, a user equipment is in RRC_IDLE state and needs to move to a connected state. However, the radio access node is unable to serve the user equipment because of being overloaded or almost coming to an overload state, for example. In such situation, it is preferable to offload the user equipment if possible, depending on the capacity available in other nodes utilising different frequency range that may have overlapping coverage. In FIG. 9B there are two radio access nodes, one 808A utilising frequency range FR1 and another 808B utilising frequency range FR2

The signalling chart discloses two alternative embodiments, 930 and 932.

First the user equipment 100 performs random access procedure 900 with NR node 808A. Then it transmits an RRC Setup Request 932 to the NR node 808A. The request may comprise information that the user equipment supports RRC setup to a radio access node of a different frequency range. The indication may be realised implicitly (for example. via message type or other field presence) or explicitly (for example via explicit signalling bit, possibly via reinterpreting existing bits), thus allowing the node to determine if an inter frequency RRC redirection without reject can be performed.

In an embodiment, the indication may also imply which cell(s) are considered measurable according to network-given criteria (such as RSRP, Q threshold, synchronization acquired, Channel-state information, for example).

In first alternative 930, the node 808A transmits an Inter-frequency redirection request 936 to another radio access node 808B utilising another frequency range. The node 808B responds with an Inter-frequency redirection response 938, informing that it allows the user equipment to access the node.

The node 808B transmits an RRC setup (RRC redirection without reject) message 912 to the user equipment which then performs random access procedure 914 with the node 808B.

In second alternative 932, the node 808A transmits an RRC setup (RRC redirection without reject) message 916 to the user equipment. The node 808A indicates to the user equipment to confirm if the inter-frequency cell measurement is good enough.

The user equipment transmits an RRC setup complete message 940 to the node 808A, the message comprising the required measurement of the node 808B.

The node 808A transmits an Inter-frequency redirection request 942 to the radio access node 808B. The node 808B responds with an Inter-frequency redirection response 944, informing that it allows the user equipment to access the node.

The node 808A uses an RRC Reconfiguration procedure 924 to redirect the user equipment to the target frequency cell by facilitating a redirection with only random access (using Contention-Based Random Access CFRA or Contention-Free Random Access CBRA).

The user equipment performs random access procedure and RRC reconfiguration complete 926 with the node 808B.

Figure 10:
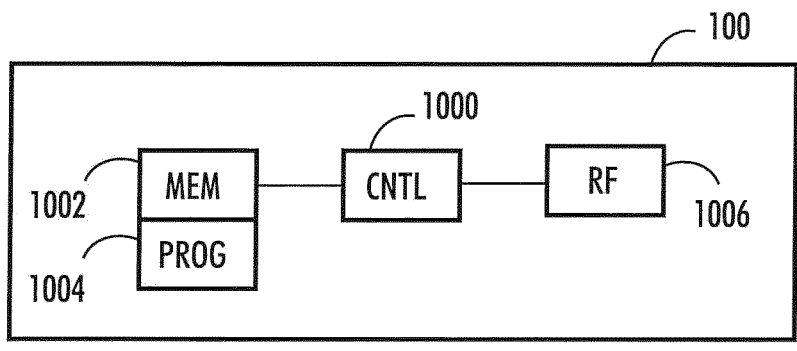
FIGS. 10, 11 and 12 illustrate simplified examples of apparatuses applying some embodiments of the invention.

FIG. 10 illustrates an embodiment. The figure illustrates a simplified example of an apparatus applying embodiments of the invention. In some embodiments, the apparatus may be user equipment, a terminal, or a part of user equipment maintaining in the user equipment more than one subscription identities.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 100 of the example includes a control circuitry 1000 configured to control at least part of the operation of the apparatus.

The apparatus may comprise a memory 1002 for storing data. Furthermore, the memory may store software 1004 executable by the control circuitry 1000. The memory may be integrated in the control circuitry.

The apparatus may comprise one or more interface circuitries 1006, The interface circuitries are operationally connected to the control circuitry 1000. An interface circuitry 1006 may be a set of transceivers configured to communicate with a RAN node, such as an (e/g)NodeB of a wireless communication network. The interface circuitry may be connected to an antenna arrangement (not shown). The apparatus may also comprise a connection to a transmitter instead of a transceiver. The apparatus may further comprise a user interface.

In an embodiment, the software 1004 may comprise a computer program comprising program code means adapted to cause the control circuitry 1000 of the apparatus to realise at least some of the embodiments described above.

Figure 11:
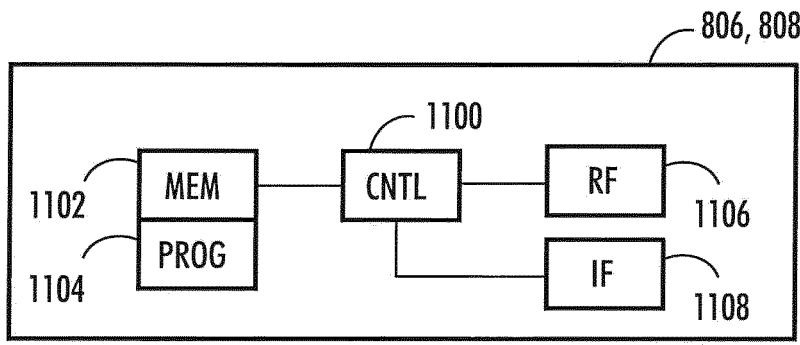

FIG. 11 illustrates an embodiment. The figure illustrates a simplified example of an apparatus or network element applying embodiments of the invention. In some embodiments, the apparatus may be a RAN node, such as an (e/g)NodeB or a part of a RAN node.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 806, 808 includes a control circuitry 1100 configured to control at least part of the operation of the apparatus.

The apparatus may comprise a memory 1102 for storing data. Furthermore, the memory may store software 1104 executable by the control circuitry 1100. The memory may be integrated in the control circuitry.

The apparatus further comprises one or more interface circuitries 1106, 1108 configured to connect the apparatus to other devices and network elements of the radio access network. An interface circuitry 1106 may be a set of transceivers configured to communicate with user terminals. An interface circuitry 1108 may be a set of transceivers configured to communicate with other network elements such as a core network. The interfaces may provide wired or wireless connections.

In an embodiment, the software 1106 may comprise a computer program comprising program code means adapted to cause the control circuitry 1100 of the apparatus to realise at least some of the embodiments described above.

Figure 12:
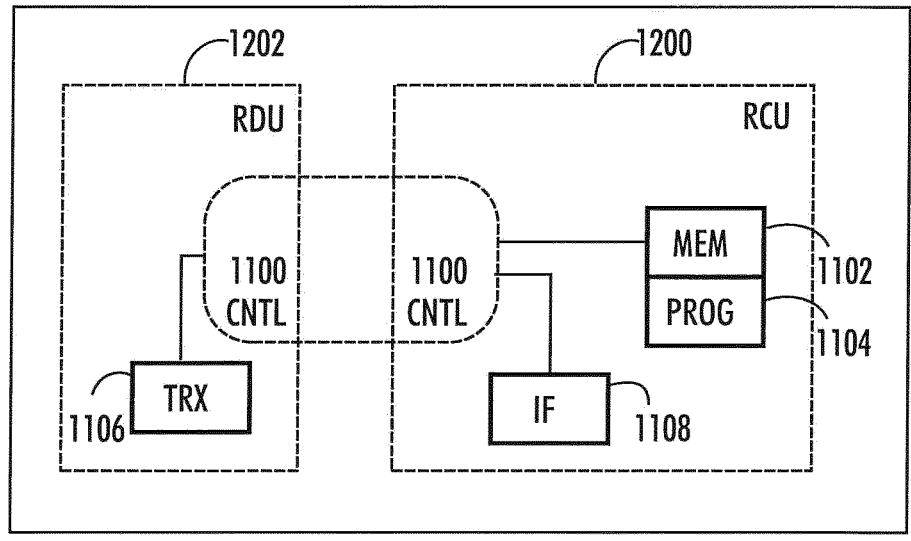

In an embodiment, as shown in FIG. 12, at least some of the functionalities of the apparatus of FIG. 11 may be shared between two physically separate devices, forming one operational entity. Therefore, the apparatus may be seen to depict the operational entity comprising one or more physically separate devices for executing at least some of the described processes. Thus, the apparatus of FIG. 11, utilizing such shared architecture, may comprise a remote control unit RCU 1200, such as a host computer or a server computer, operatively coupled (e.g. via a wireless or wired network) to a remote distributed unit RDU 1202 located in the base station. In an embodiment, at least some of the described processes may be performed by the RCU 1200. In an embodiment, the execution of at least some of the described processes may be shared among the RDU 1202 and the RCU 1200.

In an embodiment, the RCU 1200 may generate a virtual network through which the RCU 1200 communicates with the RDU 1202. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (e.g. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RDU and the RCU. In practice, any digital signal processing task may be performed in either the RDU or the RCU and the boundary where the responsibility is shifted between the RDU and the RCU may be selected according to implementation.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a non-transitory distribution medium, comprising program instructions which, when loaded into an electronic apparatus, are configured to control the apparatus to execute the embodiments described above.

An embodiment provides a computer program comprising instructions for causing an apparatus to perform at least the embodiments described above.

An embodiment provides a computer readable medium comprising program instructions for causing an apparatus to perform at least the following: transmitting a connection request to a radio access node; means for indicating to the radio access node that the apparatus supports resume or setup to a radio access node of a different system or different frequency range; means for receiving from the radio access node instructions to switch to another to a radio access node of a different system or a radio access node utilising a different frequency range and means for performing random access procedure followed by a radio resource control complete message transmission to the instructed radio access node.

An embodiment provides a computer readable medium comprising program instructions for causing an apparatus to perform at least the following: receiving a connection request from user equipment in inactive or idle mode; means for receiving from the user equipment an indication that the user equipment supports resume or setup to a radio access node of a different system or different frequency range; means for determining that the apparatus is unable to serve the user equipment and means for transmitting, based on the determination, to the user equipment instructions to switch to another to a radio access node of a different system or a radio access node utilising a different frequency range.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst several computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

In an embodiment, an apparatus comprises means for transmitting a connection request to a radio access node; means for indicating to the radio access node that the apparatus supports resume or setup to a radio access node of a different system or different frequency range; means for receiving from the radio access node instructions to switch to another to a radio access node of a different system or a radio access node utilising a different frequency range and means for performing random access procedure followed by a radio resource control complete message transmission to the instructed radio access node.

In an embodiment, an apparatus comprises means for receiving a connection request from user equipment in inactive or idle mode; means for receiving from the user equipment an indication that the user equipment supports resume or setup to a radio access node of a different system or different frequency range; means for determining that the apparatus is unable to serve the user equipment and means for transmitting, based on the determination, to the user equipment instructions to switch to another to a radio access node of a different system or a radio access node utilising a different frequency range.

It will be obvious to a person skilled in the art that, as the technology advances, the inventive concept can be implemented in various ways. The invention and its embodiments are not limited to the examples described above but may vary within the scope of the claims.

What is claimed is:

1. A user equipment (UE), comprising:
at least one processor; and
at least one non-transitory memory storing instructions that, when executed with the at least one processor, cause the UE to:
in response to the UE being in a radio resource control (RRC) inactive state:
store a plurality of user equipment contexts for the UE, wherein each context of the plurality of user equipment contexts corresponds to a different radio access technology (RAT) or a different frequency range of same RAT as the UE;
transmit an RRC connection resume request to a first radio access node, wherein the RRC connection resume request comprises a first indication to the first radio access node that the UE supports resuming an RRC connection with one or more potential target radio access nodes of the different RAT or the different frequency range of the same RAT as the UE, and wherein the first indication comprises validity information of the one or more potential target radio access nodes, the validity information comprising at least one of:
a reference signal received power (RSRP) value, or a single-bit indication that at least one of the one or more potential target radio access nodes meets a pre-defined criterion; and
receive, from the first radio access node, first instructions to switch to a second radio access node selected from the one or more potential target radio access nodes utilizing the different RAT or the different frequency range of the same RAT as the UE, wherein the first instructions direct the UE to utilize a user equipment context of the plurality of user equipment contexts;
in response to the UE being in an RRC idle state:
transmit an RRC setup request to the first radio access node, wherein the RRC setup request comprises a second indication that the UE supports establishing an RRC connection with a third radio access node of the different RAT or the different frequency range of the same RAT as the UE; and
receive, in one of an RRC setup message or an RRC reconfiguration message, second instructions from the first radio access node to switch to the third radio access node of the different RAT or the different frequency range of the same RAT as the UE;
subsequent to receiving one of the first instructions or the second instructions, perform a random access procedure with the second radio access node or the third radio access node, respectively, wherein the random access procedure comprises transmission of a first random access message (Msg1) and reception of a second random access message (Msg2); and
after completion of the random access procedure, transmit a radio resource control (RRC) complete message comprising one of an RRC Resume Complete message or an RRC Setup Complete message as a fifth message (Msg5), wherein the UE does not transmit a third random access message (Msg3) or a fourth random access message (Msg4) to the second radio access node or the third radio access node.

2. The UE of claim 1, wherein, in response to the UE being in the RRC inactive state, the instructions, when executed with the at least one processor, cause the UE further to:
receive the first instructions, to switch to the second radio access node of the different RAT or the different frequency range of the same RAT as the UE, in a RRC resume response message or a RRC release message.

3. The UE of claim 1, wherein the instructions, when executed with the at least one processor, cause the apparatus further to:
receive, from a network node, instructions to measure frequencies for available capacity;
in response to the received instructions, perform one or more measurements of the frequencies for the available capacity to generate measurement results; and
include the generated measurement results as a part of the validity information transmitted in the RRC connection resume request.

4. An apparatus in a communication system, comprising:
at least one processor; and
at least one non-transitory memory storing instructions that, when executed with the at least one processor, cause the apparatus to:
in response to receiving, from a user equipment in a radio resource control (RRC) inactive state, an RRC connection resume request:
receive, from the user equipment, a first indication associated with the RRC connection resume request, wherein the first indication indicates that the user equipment supports resuming an RRC connection with one or more potential target radio access nodes of a different radio access technology (RAT) or a different frequency range of same RAT as the apparatus, the first indication comprising validity information of the one or more potential target radio access nodes, the validity information including at least one of:

a reference signal received power (RSRP) value, or a single-bit indication that at least one of the one or more potential target radio access nodes meets a pre-defined criterion;

in response to the received first indication, determine that the apparatus is unable to serve the user equipment;

transmit a first redirection request to a second radio access node selected from the one or more potential target radio access nodes;

in response to the transmitted first redirection request, receive a first redirection response from the second radio access node; and based on the determination and the first redirection response, transmit, to the user equipment, first instructions to switch to the second radio access node, wherein the first instructions direct the user equipment to utilize a user equipment context stored at the user equipment, the user equipment context corresponding to the different RAT or the different frequency range of the second radio access node; and in response to receiving, from the user equipment in an RRC idle state, an RRC setup request:

receive, from the user equipment, a second indication that the user equipment supports setup to a third radio access node of a different RAT or a different frequency range within same RAT as the apparatus;

based on the received second indication, determine that the apparatus is unable to serve the user equipment;

transmit a second redirection request to the third radio access node utilizing the different RAT or the different frequency range;

in response to the transmitted second redirection request, receive a second redirection response from the third radio access node; and based on the determination and the second redirection response, transmit, to the user equipment, second instructions to switch to the third radio access node.

5. The apparatus of claim 4, wherein, in response to receiving, from the user equipment in the RRC inactive state, the instructions, when executed with the at least one processor, cause the apparatus further to:

transmit the first instructions, to switch to the second radio access node of the different RAT or the different frequency range within same RAT as the apparatus, in an RRC resume message or an RRC release message.

6. A method in a user equipment (UE) in a communication system, comprising:

in response to the UE being in a radio resource control (RRC) inactive state:

storing a plurality of user equipment contexts, wherein each context of the plurality of user equipment contexts corresponds to a different radio access technology (RAT) or a different frequency range of same RAT as the UE;

transmitting an RRC connection resume request to a first radio access node, wherein the RRC connection resume request comprises a first indication to the first radio access node that the UE supports resuming an RRC connection with one or more potential target radio access nodes of the different RAT or the different frequency range of the same RAT as the UE, and wherein the first indication comprises validity information of the one or more potential target radio access nodes, the validity information comprising at least one of:

a reference signal received power (RSRP) value, or a single-bit indication that at least one of the one or more potential target radio access nodes meets a pre-defined criterion; and receiving, from the first radio access node, first instructions to switch to a second radio access node selected from the one or more potential target radio access nodes utilizing the different RAT or the different frequency range of the same RAT as the UE, wherein the first instructions direct the UE to utilize a user equipment context of the plurality of user equipment contexts; and in response to the UE being in an RRC idle state:

transmitting an RRC setup request to the first radio access node, wherein the RRC setup request comprises a second indication that the UE supports establishing an RRC connection with a third radio access node of the different RAT or the different frequency range of the same RAT as the UE; and receiving, in one of an RRC setup message or an RRC configuration message, second instructions from the first radio access node to switch to the third radio access node of the different RAT or the different frequency range of the same RAT as the UE;

subsequent to receiving one of the first instructions or the second instructions, performing a random access procedure with the second radio access node or the third radio access node, respectively, wherein the random access procedure comprises transmission of a first random access message (Msg1) and reception of a second random access message (Msg2); and after completion of the random access procedure, transmitting a radio resource control (RRC) complete message comprising one of an RRC Resume Complete message or an RRC Setup Complete message as a fifth message (Msg5), wherein the UE does not transmit a third random access message (Msg3) or a fourth random access message (Msg4) to the second radio access node or the third radio access node.

7. A method in an apparatus in a communication system, comprising:

in response to receiving, from a user equipment in a radio resource control (RRC) inactive state, an RRC connection resume request:

receiving, from the user equipment, an first indication associated with the RRC connection resume request, wherein the first indication indicates that the user equipment supports resuming an RRC connection with one or more potential target radio access nodes of a different radio access technology (RAT) or a different frequency range of same RAT as the apparatus, the first indication comprising validity information of the one or more potential target radio access nodes, the validity information including at least one of:

a reference signal received power (RSRP) value, or a single-bit indication that at least one of the one or more potential target radio access nodes meets a pre-defined criterion;

in response to the received first indication, determining that the apparatus is unable to serve the user equipment;

transmitting a first redirection request to a second radio access node selected from the one or more potential target radio access nodes;

in response to the transmitted first redirection request, receiving a first redirection response from the second radio access node; and based on the determination and the first redirection response, transmitting, to the user equipment, first instructions to switch to the second radio access node, wherein the first instructions direct the user equipment to utilize a user equipment context stored at the user equipment, the user equipment context corresponding to the different RAT or the different frequency range of the second radio access node; and in response to receiving, from the user equipment in an RRC idle state, an RRC setup request:

receiving, from the user equipment, a second indication that the user equipment supports setup to a third radio access node of a different RAT or a different frequency range within same RAT as the apparatus;

based on the received second indication, determining that the apparatus is unable to serve the user equipment;

transmitting a second redirection request to the third radio access node utilizing the different RAT or the different frequency range:

in response to the transmitted second redirection request, receive a second redirection response from the third radio access node; and based on the determination and the second redirection response, transmitting, to the user equipment, second instructions to switch to the third radio access node.

\* \* \* \* \*